United States Patent
Kim et al.

(10) Patent No.: US 12,014,843 B2
(45) Date of Patent: Jun. 18, 2024

(54) JOINING STRUCTURE OF DIFFERENT KINDS OF CONDUCTORS, JOINING METHOD OF DIFFERENT KINDS OF CONDUCTORS, AND JOINT OF POWER CABLES

(71) Applicant: LS CABLE & SYSTEM LTD., Anyang-si (KR)

(72) Inventors: Jeong Ik Kim, Seongnam-si (KR); Sangyum Kim, Anyang-si (KR); Hyun Su Kim, Seoul (KR)

(73) Assignee: LS CABLE & SYSTEM LTD., Anyang-si (KR)

(*) Notice: Subject to any disclaimer, the term of this patent is extended or adjusted under 35 U.S.C. 154(b) by 848 days.

(21) Appl. No.: 17/106,891

(22) Filed: Nov. 30, 2020

(65) Prior Publication Data

US 2022/0172864 A1   Jun. 2, 2022

(51) Int. Cl.
| | | |
|---|---|---|
| *H01B 13/00* | (2006.01) | |
| *B29C 65/00* | (2006.01) | |
| *H01B 1/02* | (2006.01) | |
| *H01B 13/06* | (2006.01) | |
| *B29L 31/34* | (2006.01) | |
| *H01B 3/52* | (2006.01) | |

(52) U.S. Cl.
CPC ...... *H01B 13/0023* (2013.01); *B29C 66/1142* (2013.01); *H01B 1/023* (2013.01); *H01B 13/062* (2013.01); *B29L 2031/3462* (2013.01); *H01B 3/52* (2013.01)

(58) Field of Classification Search
CPC .......... H01B 1/02; H01B 1/023; H01B 1/026; H01B 1/04; H01B 1/06; H01B 13/00; H01B 13/0006; H01B 13/0023; H01B 13/02; H01B 13/062; H01B 13/14; H01B 13/22; H01B 3/52; B23K 11/02; B23K 11/04; B23K 11/16; B23K 11/185; B23K 11/20; B23K 11/34; B23K 2101/32; B23K 2103/08; B23K 2103/10; B23K 2103/12; B23K 2103/18; B23K 2103/20; B29C 66/1142; B29L 2031/3462

See application file for complete search history.

(56) References Cited

U.S. PATENT DOCUMENTS

| | | | | |
|---|---|---|---|---|
| 3,702,372 A | * | 11/1972 | Troccoli | H02G 15/18 |
| | | | | 174/84 C |
| 7,872,197 B2 | * | 1/2011 | Vallauri | H02G 15/1826 |
| | | | | 174/93 |

(Continued)

FOREIGN PATENT DOCUMENTS

| | | |
|---|---|---|
| JP | 2001352655 A | 12/2001 |
| KR | 20000059157 A | 10/2000 |

(Continued)

OTHER PUBLICATIONS

Office Action for related Korean Application No. 10-2018-0157592; action dated Jun. 22, 2023; (6 pages).

*Primary Examiner* — Hung D Nguyen

(74) *Attorney, Agent, or Firm* — K&L Gates LLP

(57) ABSTRACT

Disclosed are a joining structure of different kinds of conductors, a joining method of different kinds of conductors, and a joint of power cables capable of improving joining reliability of a junction of the different kinds of conductors.

20 Claims, 13 Drawing Sheets

(56) References Cited

U.S. PATENT DOCUMENTS

| | | | | |
|---|---|---|---|---|
| 2013/0165326 | A1* | 6/2013 | Yagi | H01B 12/02 |
| | | | | 505/230 |
| 2017/0330648 | A1* | 11/2017 | Krogh | H01R 4/021 |
| 2021/0005346 | A1* | 1/2021 | Tomizawa | H02K 3/24 |
| 2021/0394296 | A1* | 12/2021 | Stock | B23K 11/046 |

FOREIGN PATENT DOCUMENTS

| | | | | |
|---|---|---|---|---|
| KR | 20090104800 | A | 10/2009 | |
| KR | 20120004111 | A | 1/2012 | |
| KR | 20130079905 | A | 7/2013 | |
| WO | WO-2015/135605 | A1* | 9/2015 | H01R 4/021 |

\* cited by examiner

MICROHARDNESS TEST OF
RECRYSTALLIZED ZONE (HEAT-AFFECTED ZONE)

JOINING STRUCTURE OF DIFFERENT KINDS OF CONDUCTORS, JOINING METHOD OF DIFFERENT KINDS OF CONDUCTORS, AND JOINT OF POWER CABLES

FIELD

The present disclosure relates to a joining structure of different kinds of conductors, a joining method of different kinds of conductors, and a joint of power cables, and more particularly to a joining structure of different kinds of conductors, a joining method of different kinds of conductors, and a joint of power cables capable of improving joining reliability of a junction of the different kinds of conductors.

BACKGROUND

A power cable configured to supply power may include a copper- or aluminum-based conductor, an insulation layer, a semiconductor layer, and an outer jacket.

A power transmission cable includes a conductor and an insulator. The conductor requires high electrical conductivity in order to minimize energy loss. Copper and aluminum are materials for the conductor that exhibit high electrical conductivity and also have price competitiveness. Copper is superior in electrical and mechanical properties to aluminum except for density. Consequently, copper is mainly applied to the conductor of the power transmission cable, and an aluminum conductor is restrictively used in an overhead power transmission line importantly requiring a light weight.

With an increase in copper raw material price, the price of copper is 4 to 6 times the price of aluminum per unit weight. For this reason, a request for applying an aluminum conductor to the power transmission cable has increased. Since copper is mainly applied to a conventional cable conductor, it is expected that a request for direct joining between a copper conductor and an aluminum conductor will also increase with spread in application of aluminum.

Copper, which is the material of a conductor, exhibits higher electrical conductivity than aluminum but is more expensive than aluminum. In contrast, aluminum is characterized in that aluminum is inexpensive although aluminum exhibits lower electrical conductivity than copper.

In addition, a stranded-wire conductor having a structure in which a plurality of circular or square conductor wires is stranded in consideration of flexibility and the like is mainly used as a power cable conductor. In the case in which power cables including different kinds of conductors are joined to each other, conductor joining using a method of welding the different kinds of conductors may be considered. In the welding process, however, apertures are present in a copper stranded-wire conductor, the melting point of the copper stranded-wire conductor is higher, and an oxidation film is formed on the copper stranded-wire conductor at the time of high-temperature welding, whereby the quality of a weld portion may be deteriorated.

Thereupon, Korean Registered Patent No. 1128106 discloses a method of connecting conductors using a dedicated sleeve member for joining different kinds of stranded-wire conductors, such as copper or aluminum. The sleeve member may be constituted by a joining metal including an insertion hole, into which a first conductor made of copper is inserted, and a junction surface, to which a second aluminum-based conductor is welded by metal inert gas (MIG) welding or tungsten inert gas (TIG) welding.

The first conductor, made of copper, may be inserted and pressed into the insertion hole, formed at one side of the sleeve member, and the aluminum conductor may be joined to the junction surface, formed at the other side of the sleeve member, by welding.

The joining metal type sleeve member is high in price, and two processes, such as pressing and welding, using the sleeve member are further required. Therefore, there is a need for a new method capable of solving problems related to an increase in price and addition of processes.

SUMMARY

It is an object of the present disclosure to provide a joining structure of different kinds of conductors, a joining method of different kinds of conductors, and a joint of power cables capable of improving joining reliability of a junction of the different kinds of conductors.

In accordance with one aspect of the present disclosure, the above and other objects can be accomplished by the provision of a joining structure of different kinds of conductors formed by joining a first conductor constituting a first power cable and a second conductor constituting a second power cable to each other, wherein the first conductor includes a plurality of conductor wires, an end side surface of the first conductor being processed such that the space factor of the end side surface is equal to or higher than a predetermined level, and the end side surface of the first conductor and an end side surface of the second conductor are joined to each other by welding.

The melting point of the first conductor may be higher than the melting point of the second conductor.

The second conductor may also include a plurality of conductor wires.

Here, the first conductor may be made of a copper material or a copper alloy material, and the second conductor may be made of an aluminum material or an aluminum alloy material.

In this case, the space factor of the end side surface of the first conductor may be 98% or more.

End side surfaces of a pair of first conductors may be joined to each other by welding such that the space factor of the end side surface of each of the first conductors is equal to or higher than the predetermined level to form a junction, and the junction may be cut, whereby each of the first conductors may be processed such that the space factor of the end side surface of each of the first conductors is equal to or higher than the predetermined level.

The end side surface of the first conductor and the end side surface of the second conductor may be joined to each other by upset butt welding.

Here, the upset butt welding may be performed using a method of energizing the first conductor and the second conductor to melt a junction of the first conductor and the second conductor and pressing the first conductor and the second conductor toward each other.

In this case, the exposed length of the first conductor from a welding jig configured to weld the first conductor and the second conductor may be less than the exposed length of the second conductor from the welding jig.

The diameter of the first conductor may be less than the diameter of the second conductor.

An O-ring having an outer circumferential surface inclined so as to finish a stepped portion formed due to the diameter difference between the first conductor and the second conductor as an inclined surface may also be joined to the junction of the first conductor and the second conductor.

Here, the O-ring may have a through hole configured to allow the first conductor to extend therethrough, and the first conductor, the O-ring, and the second conductor may be joined to each other in a state in which an end of the first conductor is mounted in the through hole.

In this case, the O-ring may be made of a second metal material, a side surface of the O-ring in a joining direction and the end side surface of the second conductor may be joined to each other, and the inner circumferential surface of the through hole of the O-ring may be joined to the outer circumferential surface of the first conductor.

In accordance with another aspect of the present disclosure, there is provided a joint of power cables including different kinds of conductors, the joint including the joining structure described above, a corona shield configured to connect ends of crosslinked polyethylene (XLPE) insulation layers of the first power cable and the second power cable to each other, the corona shield being configured to wrap the joining structure, a pre-molded joint (PMJ) type sleeve member mounted outside the corona shield, the sleeve member being made of an elastic resin material, and a housing mounted outside the sleeve member.

The joint may include a paper-insulated insulation layer of the first power cable, a paper-insulated insulation layer of the second power cable, and a reinforced insulation layer formed as a result of insulation paper being wound outside the joining structure.

In accordance with a further aspect of the present disclosure, there is provided a joining method of different kinds of conductors to join a first conductor constituting a first power cable and a second conductor constituting a second power cable to each other, the joining method including processing an end side surface of the first conductor, the first conductor comprising stranded wires, such that the space factor of the end side surface is equal to or higher than a predetermined level (a side surface processing step), mounting the first conductor and the second conductor to a welding jig such that an end of the first conductor is exposed by a predetermined length and an end of the second conductor, the second conductor having a lower melting point than the first conductor, is exposed by a predetermined length (a conductor mounting step), and joining the end side surface of the first conductor and an end side surface of the second conductor to each other by welding (a conductor joining step).

In the side surface processing step of the first conductor, end side surfaces of a pair of first conductors may be joined to each other by welding such that the space factor of the end side surface of each of the first conductors is equal to or higher than the predetermined level to form a junction, and the junction may be cut, whereby each of the first conductors may be processed such that the space factor of the end side surface of each of the first conductors is equal to or higher than the predetermined level.

The side surface processing step of the first conductor may be performed such that the space factor of the end side surface of the first conductor is 98% or more.

Here, the conductor joining step may be performed by upset butt welding.

In this case, the upset butt welding in the conductor joining step may be performed using a method of energizing the first conductor and the second conductor to melt a junction of the first conductor and the second conductor and pressing the first conductor and the second conductor toward each other.

Here, the conductor mounting step may be performed such that the exposed length of an end of the first conductor is less than the exposed length of an end of the second conductor.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
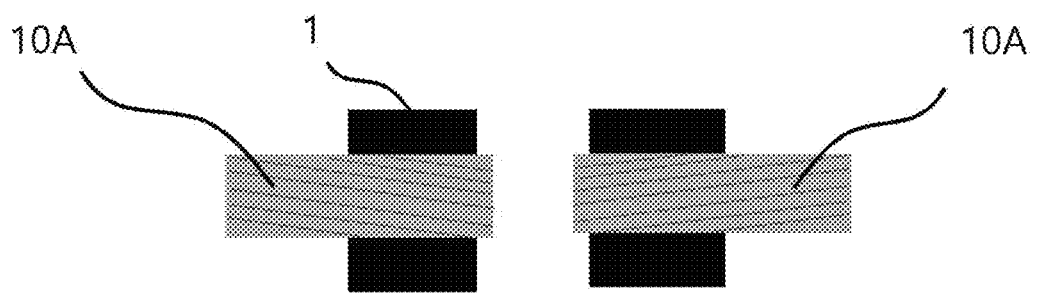
FIG. 1 shows a state in which copper stranded-wire conductors as a pair of first conductors are mounted to a welding jig.

Hereinafter, embodiments of the present disclosure will be described in detail with reference to the accompanying drawings. However, the present disclosure is not limited to the embodiments described herein, and may be embodied in various different forms. Rather, these embodiments are provided so that the present disclosure will be thorough and complete, and will fully convey the scope of the present disclosure to those skilled in the art. Wherever possible, the same reference numbers will be used throughout the specification to refer to the same or like parts.

A conductor of a power cable may be changed in consideration of expenses depending on an environment (a land or a seabed) in which the power cable is installed. Even in a case in which the kinds of conductors constituting power cables are different from each other depending on characteristics of conductors of the power cables required for each section, jointing between the power cables may be performed.

In the case in which the conductors of the power cables jointed therebetween are different in kind from each other, it is difficult to guarantee joining quality of a junction of the conductors through the use of a normal joining method, since the conductors may have different melting points and may be different from each other in terms of the extent to which an oxidation film is formed.

Therefore, the present disclosure provides a joining structure of different kinds of conductors wherein the end side surface of a first conductor of a first power cable, the first conductor being formed as a stranded-wire conductor formed as a result of a plurality of conductor wires being stranded, and the end side surface of a second conductor of a second power cable, the second conductor being formed as a stranded-wire conductor formed as a result of a plurality of conductor wires being stranded, are joined to each other, and wherein the end side surface of the first conductor is processed such that the space factor of the end side surface is equal to or higher than a predetermined level, and the end side surface of the first conductor and the end side surface of the second conductor are joined to each other by resistance welding (e.g. upset butt welding).

FIGS. 1 to 6 are conceptual views showing a process of processing the end side surface of a copper stranded-wire conductor, as a first conductor 10A, such that the space factor of the end side surface is equal to or higher than a predetermined level and images of the processing process.

The first conductor may be a copper stranded-wire conductor formed as a result of a plurality of conductor wires made of a copper material or a copper alloy material being stranded, and a second conductor, a description of which will follow, may be an aluminum stranded-wire conductor having a relatively low melting point. In the case in which the first conductor and the second conductor are joined to each other by resistance welding, apertures are present in the end side surface of the first conductor and a thick oxidation film is formed along each aperture in a welding process at a temperature between the melting point of the first conductor and the melting point of the second conductor since the melting point of the second conductor is low, whereby quality of a junction of the first conductor and the second conductor may be deteriorated.

In the present disclosure, therefore, a process of processing the end side surface of the first conductor 10A, which has a high melting point, such that the space factor of the end side surface is equal to or higher than a predetermined level may be performed before the first conductor and the second conductor, each of which is a stranded-wire conductor, are joined to each other by resistance welding.

That is, the end side surface of the first conductor, which is a stranded-wire conductor, may be provided in a state in which apertures are removed or minimized in order to inhibit generation of an oxidation film at the time of welding, whereby it is possible to improve joining quality of the junction formed by welding.

Here, the space factor of a conductor constituting a power cable means a ratio of the area of a plurality of conductor wires to the area of a conductor including the plurality of conductor wires based on the outer diameter thereof. That the space factor is high may mean that empty space in the section of the conductor is small. A space factor of 100% may be interpreted as no space.

Consequently, that the first conductor of the present disclosure is processed such that the space factor of the first conductor is equal to or higher than a predetermined level means that the percentage of empty space in the side surface of the first conductor, which is the copper stranded-wire conductor, is reduced to a predetermined level or less.

Hereinafter, a process of processing the end side surface of the first conductor such that the space factor of the end side surface is equal to or higher than a predetermined level will be described in detail.

Figure 2:
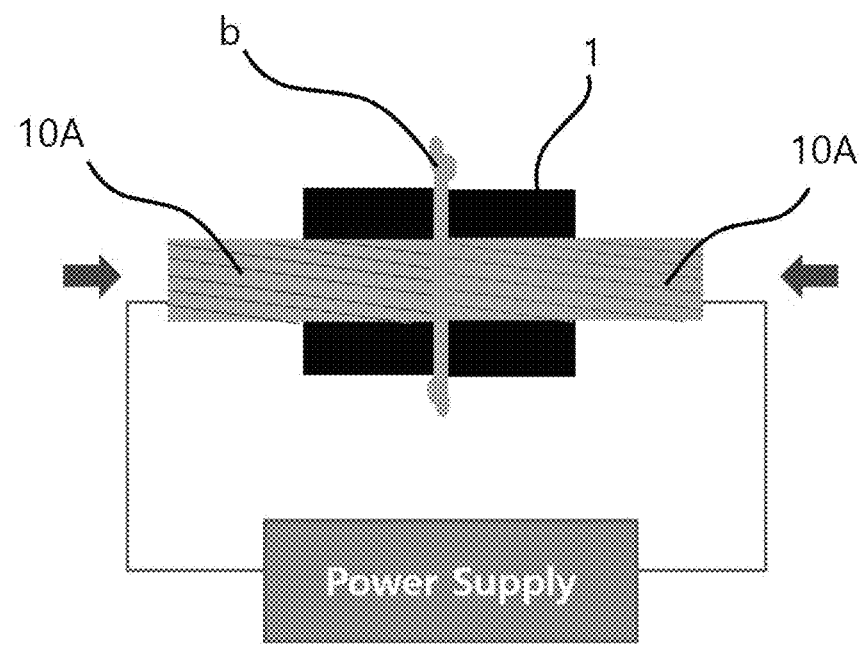
FIG. 2 shows a process of joining end side surfaces of the pair of first conductors to each other by resistance welding.
Figure 3:
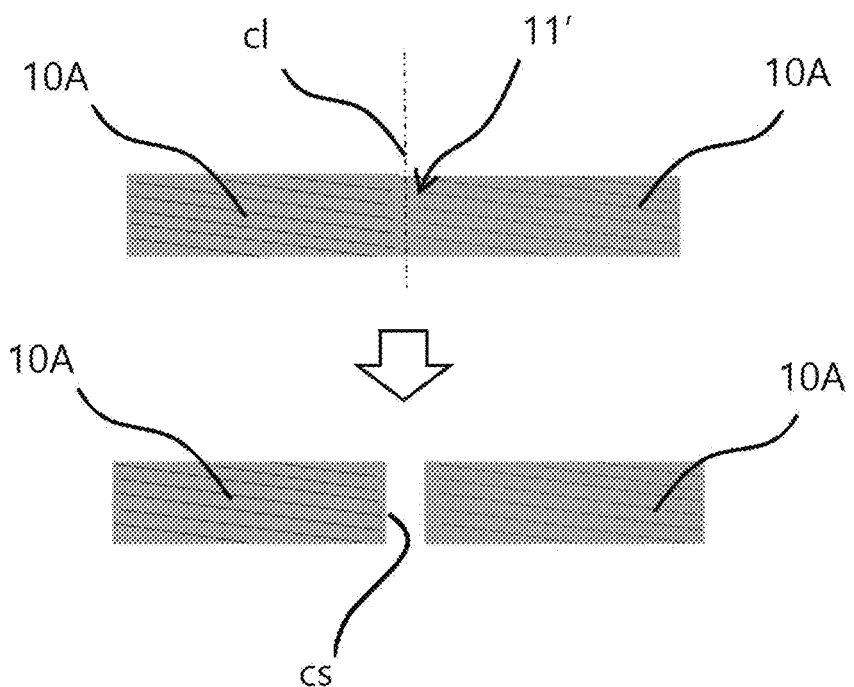
FIG. 3 shows a process of removing burrs from a junction of the joined first conductors and cutting the junction along a cutting line.

FIG. 1 shows a state in which copper stranded-wire conductors as a pair of first conductors 10A are mounted to a welding jig 1, FIG. 2 shows a process of joining end side surfaces of the pair of first conductors 10A to each other by resistance welding, and FIG. 3 shows a process of removing burrs b from a junction 11 of the joined first conductors 10A and cutting the junction 11 along a cutting line cl.

In a process of processing an end side surface cs of a first conductor 10A having a high melting point, among a first conductor and a second conductor, which are objects to be joined to each other, such that the space factor of the end side surface cs is equal to or higher than a predetermined level, a method of welding the first conductors made of the same material by resistance welding, removing burrs b from the junction 11, and cutting the junction 11, as shown in FIGS. 1 to 3, may be used. The end side surfaces of the pair of first conductors 10A may be welded to each other by upset butt welding; however, the present disclosure is not limited thereto.

Figure 4:
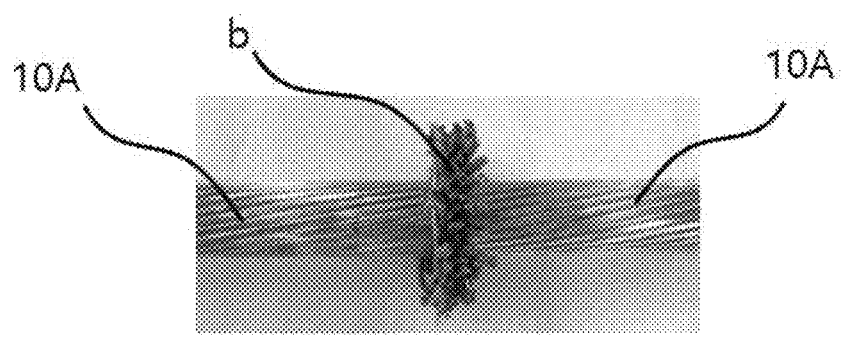
FIG. 4 shows a state in which a pair of first conductors as copper stranded-wire conductors are joined to each other.
Figure 5:
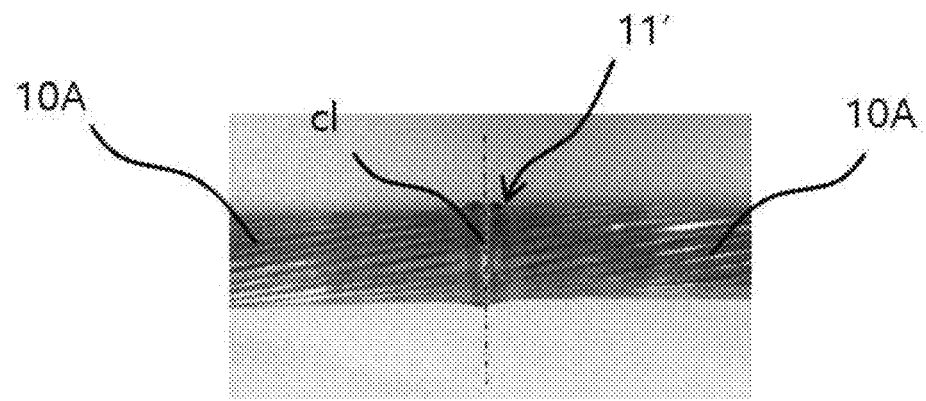
FIG. 5 shows a state in which burrs are removed from a junction of the first conductors.
Figure 6:
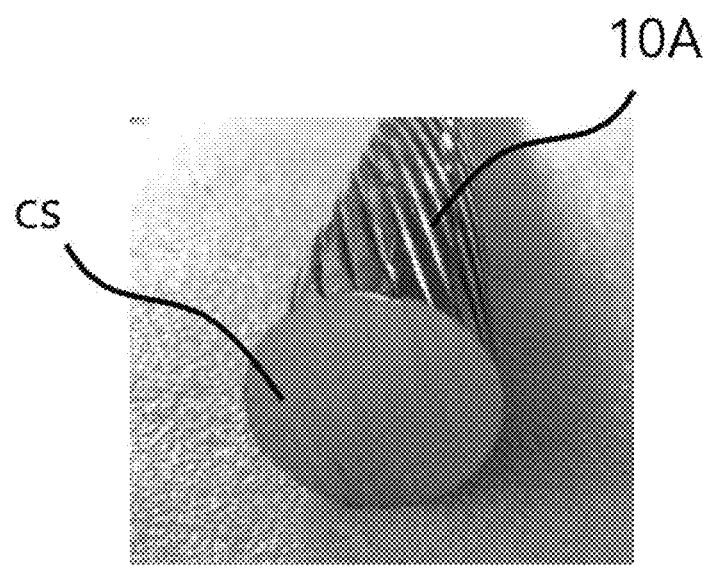
FIG. 6 shows a new end side surface of any one of the first conductors formed as a result of the junction of the pair of first conductors being cut.

FIG. 4 shows a state in which a pair of first conductors 10A as copper stranded-wire conductors are joined to each other, FIG. 5 shows a state in which burrs b are removed from a junction 11' of the first conductors 10A, and FIG. 6 shows a new end side surface cs of any one of the first conductors 10A formed as a result of the junction 11' of the pair of first conductors 10A being cut.

As shown in FIG. 4, the pair of first conductors 10A is welded and recrystallized by upset butt welding while forming the burrs b during a pressing process. In the case in which the recrystallized junction 11' is cut, the cut surface of the junction 11' of the first conductors 10A may be processed as a smooth metal surface from which apertures present in stranded-wire conductors are hardly discovered, as shown in FIG. 6.

Consequently, a process of processing an end side surface cs of a first conductor 10A having a high melting point, among a first conductor and a second conductor, which are objects to be joined to each other, such that the space factor of the end side surface cs is equal to or higher than a predetermined level may be a process of entirely imparting conductivity to the stranded-wire conductors at a joining zone thereof.

In the process of processing the end side surface of the first conductor 10A such that the space factor of the end side surface is equal to or higher than a predetermined level, a method of heating the end side surface of a first conductor 10A using a heating jig having a melting point higher than the melting point of the first conductor 10A to recrystallize the end side surface of the first conductor 10A may be used in addition to a method of joining the pair of first identical conductors 10A to each other and cutting the junction 11', as shown in FIGS. 1 to 6.

As shown in FIG. 6, the new end side surface cs of any one of the first conductors 10A formed as a result of the junction 11' of the pair of first conductors 10A being cut is shown as forming a smooth surface having a space factor of almost 100%. However, it can be seen that the quality of a junction 11 formed as a result of resistance welding between the first conductor 10A and an aluminum stranded-wire conductor is not deteriorated as long as the results of a test reveal that the space factor of the new end side surface of the first conductor 10A is about 98% or more, which is higher than the space factor of a general stranded-wire conductor.

FIGS. 7 to 14 show a process of joining a first conductor 10A having an end side surface processed such that the space factor of the end side surface is equal to or higher than a predetermined level and an aluminum stranded-wire conductor, as a second conductor 10B, and images of the joining process.

Figure 7:
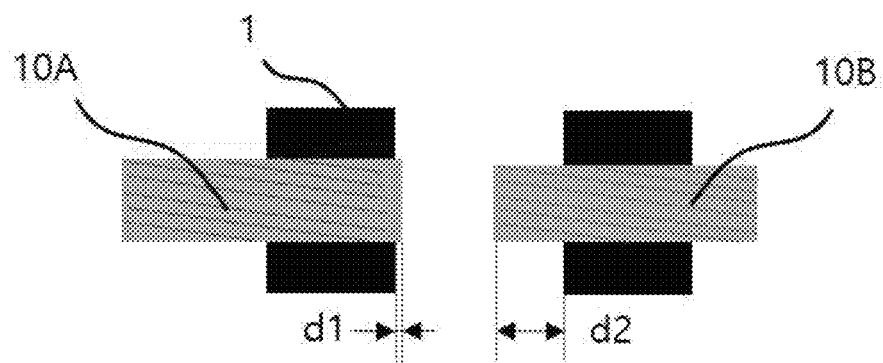
FIG. 7 shows a state in which a pair of a copper stranded-wire conductor, as a first conductor, and an aluminum stranded-wire conductor, as a second conductor, are mounted to a welding jig.
Figure 8:
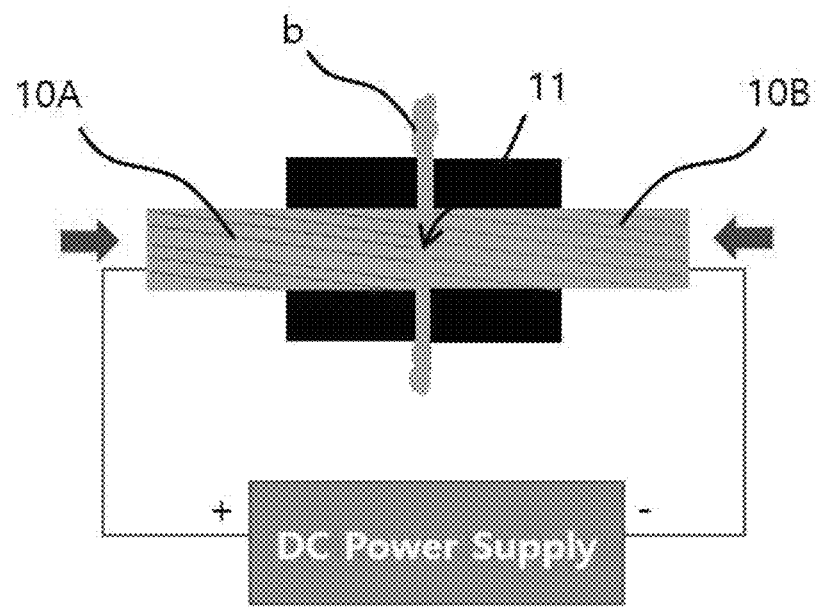
FIG. 8 shows a process of joining end side surfaces of the first conductor and the second conductor to each other by resistance welding.
Figure 9:
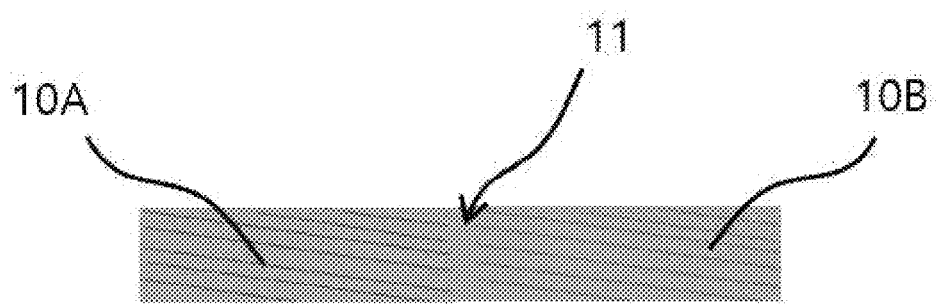
FIG. 9 shows a state in which burrs are removed from a junction of the first conductor and the second conductor joined to each other and joining is completed.

FIG. 7 shows a state in which a pair of a copper stranded-wire conductor, as a first conductor 10A, and an aluminum stranded-wire conductor, as a second conductor 10B, are mounted to a welding jig 1, FIG. 8 shows a process of joining end side surfaces of the first conductor 10A and the second conductor 10B to each other by resistance welding, and FIG. 9 shows a state in which burrs b are removed from a junction 11 of the first conductor 10A and the second conductor 10B joined to each other and joining is completed.

As shown in FIG. 7, when the first conductor 10A and the second conductor 10B are brought into contact with each other and energized in a state in which the first conductor 10A and the second conductor 10B are mounted to the welding jig 1, the conductors are melted in the vicinity of contact surfaces thereof. At this time, when both conductors are pressed in a contact direction, as shown in FIG. 8, burrs b may be formed, and a junction 11 may be formed in the vicinity of junction surfaces of the conductors.

Upset butt welding may be used as a welding method of joining the first conductor 10A and the second conductor 10B, as shown in FIG. 8. Upset butt welding is a joining method of heating the junction 11 using Joule heat through energization and using melting of materials as a direct heat source. Upset butt welding according to the present disclosure may include an energization heating process through the supply of current and a pressing process of pressing conductors when the conductors start to be melted at a joining interface therebetween.

In addition, as shown in FIG. 7, the first conductor 10A and the second conductor 10B may have different lengths exposed in a joining direction in a state of being mounted to the welding jig 1.

In the case in which the first conductor 10A and the second conductor 10B are brought into contact with each other and energized as an upset butt welding method, it may be advantageous in improving joining quality when the second conductor 10B made of an aluminum material having a melting point lower than the melting point of the first conductor 10A, the end side surface of which is processed such that the space factor of the end side surface is equal to or higher than a predetermined level, is melted first or much more to form the junction 11.

As shown in FIG. 7, therefore, it is preferable that the exposed length d2 of the second conductor 10B be greater than the exposed length d1 of the first conductor 10A. Specifically, the exposed length d2 of the second conductor 10B may be twice or more, preferably 10 times or more, of the exposed length d1 of the first conductor 10A.

The second conductor 10B may be made of aluminum or an aluminum alloy. Since the melting point of the second conductor is lower than the melting point of the first conductor 10A, which is made of a copper material, and the length of the second conductor exposed from the welding jig is greater than the exposed length of the first conductor 10A, the second conductor 10B may sufficiently melt and may be uniformly joined to the first conductor 10A at the junction 11 even in a case of being welded in a stranded-wire conductor state.

In addition, when burrs b are removed from the outer circumferential surface of the junction 11 after joining is completed, a conductor joining structure may be completed, as shown in FIG. 9.

Figure 10:
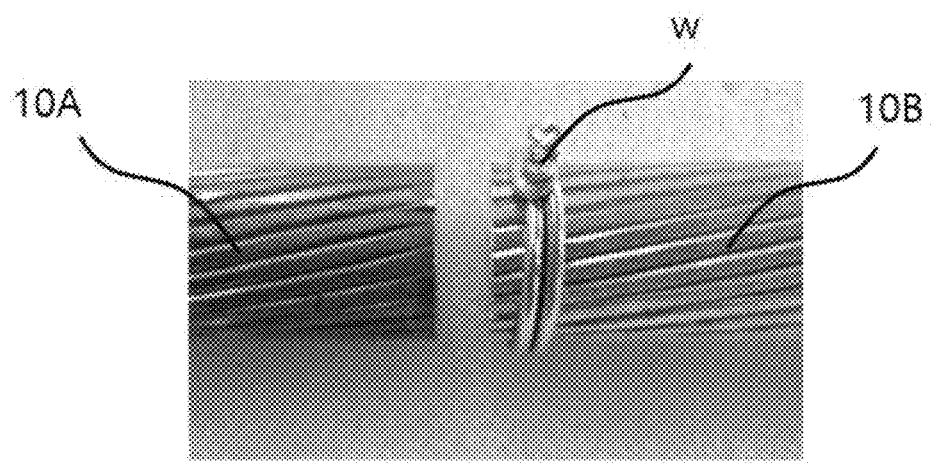
FIG. 10 shows a first conductor having an end side surface processed so as to have a high space factor and a second conductor, including aluminum stranded wires, joined to the first conductor.
Figure 11:
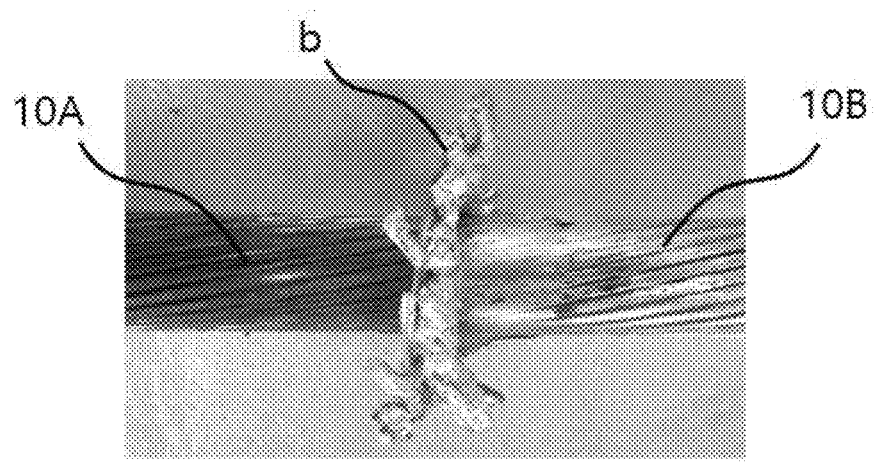
FIG. 11 shows the first conductor and the second conductor joined to each other by upset butt welding.
Figure 12:
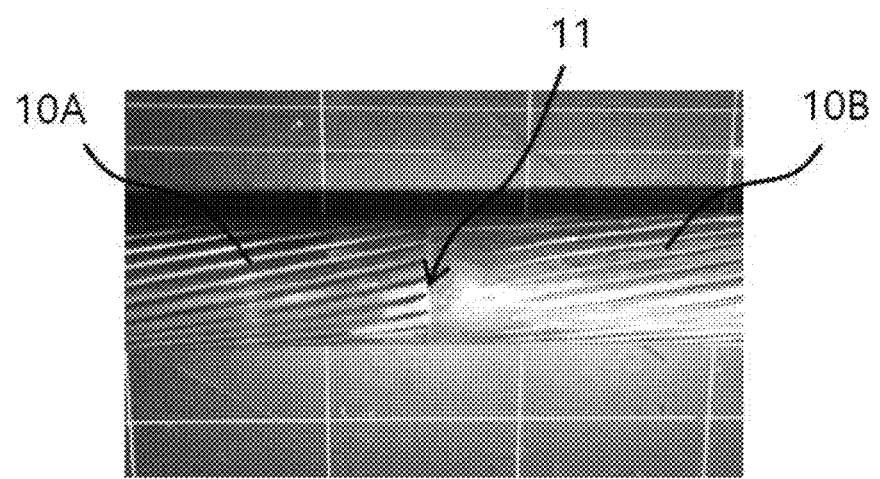
FIG. 12 shows a conductor joining structure in which burrs are removed from a junction of the first conductor and the second conductor joined to each other.

FIG. 10 shows a first conductor 10A having an end side surface processed so as to have a high space factor and a second conductor 10B, including aluminum stranded wires, joined to the first conductor 10A, FIG. 11 shows the first conductor 10A and the second conductor 10B joined to each other by upset butt welding, and FIG. 12 shows a conductor joining structure in which burrs b are removed from a junction 11 of the first conductor 10A and the second conductor 10B joined to each other.

The end side surface of the first conductor 10A is processed such that the space factor of the end side surface is equal to or higher than a predetermined level, and the exposed length of the first conductor 10A from the welding jig 1 for joining is less than the exposed length of the second conductor 10B. However, the second conductor 10B includes stranded wires and has a long exposed length from the welding jig 1, whereby the stranded wires may be split from each other during upset butt welding. In order to prevent this, work may be performed in a state in which the end of the second conductor 10B is tied up using an aluminum wire w, as shown in FIG. 10. The wire w may be removed in a pressing process of upset butt welding or may be removed together with the burrs b in a process of removing the burrs b, whereby a joining structure of different metal conductors may be completed, as shown in FIG. 12.

Figure 13:
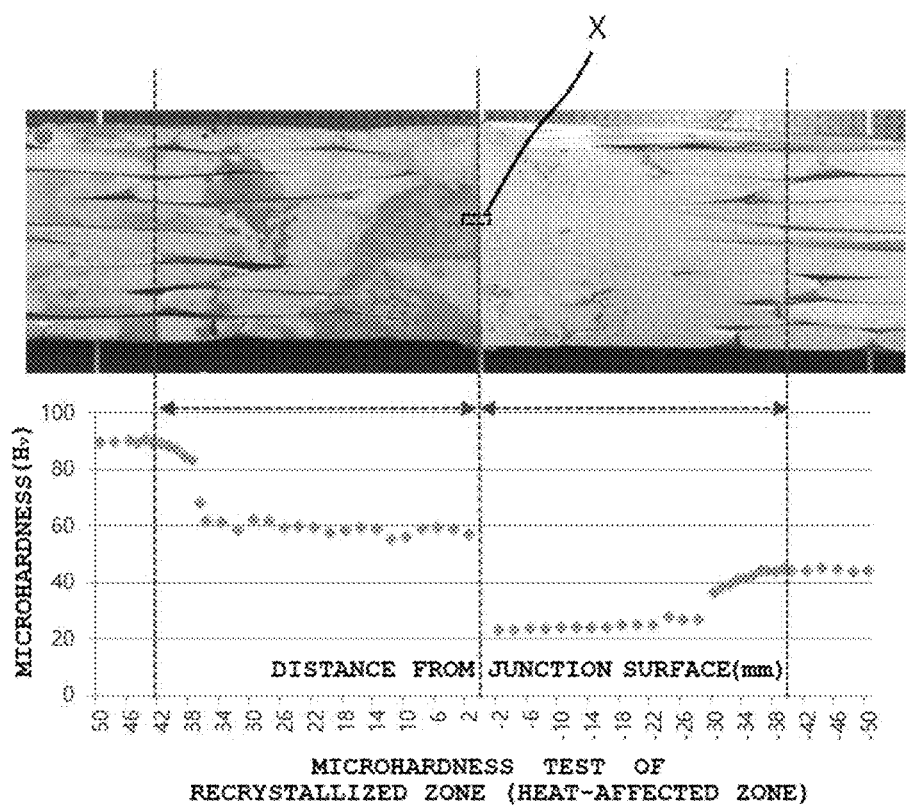
FIG. 13 shows the results of a microhardness test of the structure of the junction of different kinds of conductors including the first conductor and the second conductor according to the present disclosure after the joining structure of different kinds of conductors is cut in a longitudinal direction.

FIG. 13 shows the results of a microhardness test of the structure of the junction 11 of different kinds of conductors including the first conductor 10A and the second conductor 10B according to the present disclosure after the joining structure of different kinds of conductors is cut in a longitudinal direction.

The results of a gradual change in microhardness (Hv) from the junction surface, which is a boundary zone of the junction 11, to boundaries about 40 mm from the junction surface are shown. It is possible to confirm whether melting and recrystallization have been performed at each point through a change in microhardness, and it is possible to confirm that recrystallization and joining have been performed within similar ranges (distances) at the junction surfaces of the conductors.

That is, in the case in which the first conductor 10A, which has pre-processed stranded wires formed at the end side surface thereof, and the second conductor 10B, including stranded wires, are welded to each other by upset butt welding, welding and recrystallization ranges are similarly formed, whereby it is possible to confirm that the joining quality of the junction 11 formed using the above conductor joining method is good.

Figure 14:
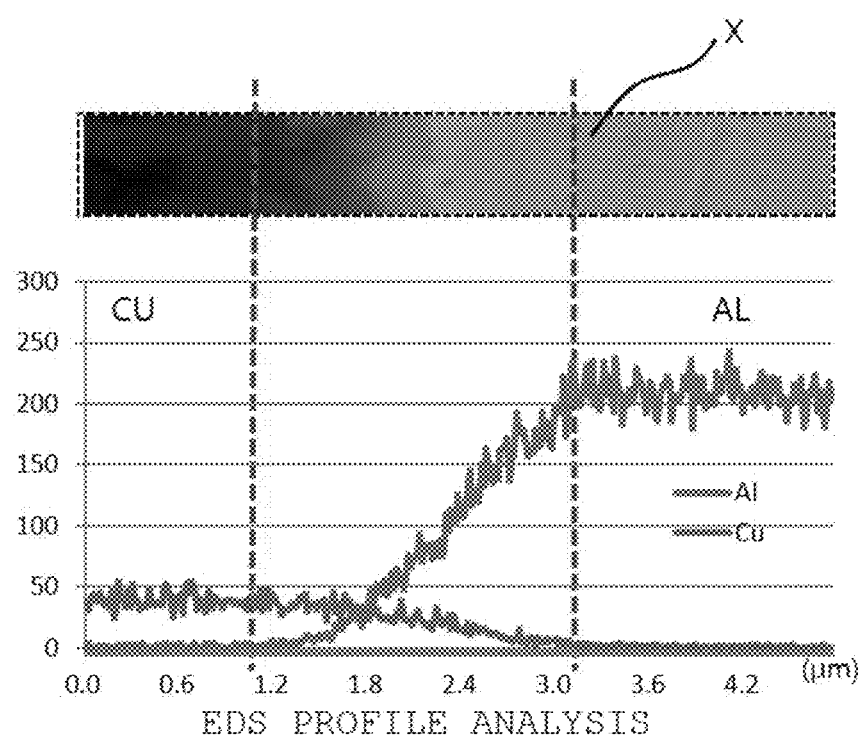
FIG. 14 shows the results of a solid diffusion state test at a junction surface boundary zone of the junction shown in FIG. 13.

FIG. 14 shows the results of a solid diffusion state test at a junction surface boundary zone X of the junction shown in FIG. 13 (EDS profile analysis). A solid diffusion phenomenon at the junction surfaces of the first conductor 10A and the second conductor 10B means that a compound different from the first conductor 10A and the second conductor 10B is generated based on the junction surfaces. It is known that generation and growth of a compound at the junction surfaces of both conductors joined to each other is influenced by diffusion of atoms and that the diffusion of atoms is based on the Arrhenius equation.

Also, in the case of the first conductor 10A and the second conductor 10B, i.e. the Al and Cu conductors, joined to each other using the upset butt welding method, it can be seen that the thickness of the compound formed at the junction surfaces of both conductors joined to each other through direct heating using direct-current electricity according to a conductor joining method according to the present disclosure is greater than in the case in which indirect heating is performed using a heat treating furnace according to a method of heating the junction 11 of the Al and Cu conductors.

That is, it is known that, in the case in which direct heating is performed at a temperature of 200° C. or 235° C. for a long time (e.g. several tens of hours) using the heat treating furnace, as shown in FIG. 14, the thickness of the compound at the junction surfaces that can be prescribed as the solid diffusion range is about 0.7 µm or about 1.0 µm.

On the other hand, it can be seen that, in the case in which the first conductor, the end side surface of which is preprocessed, and the second conductor of the present disclosure are directly heated using current, as shown in FIG. 14, the thickness of the compound at the junction surfaces is about 2 µm, and therefore the thickness of the compound at the junction surfaces is greater than in a conventional case in which direct heating is performed.

In addition, the thickness of the compound at the junction surfaces of the conductors is much less than 2.5 µm, which is known to be a critical thickness of ductility/brittleness fracture of a power cable conductor at the time of joining conductors, and therefore it is expected that a danger of ductility or brittleness fracture of the junction may be low.

Figure 15:
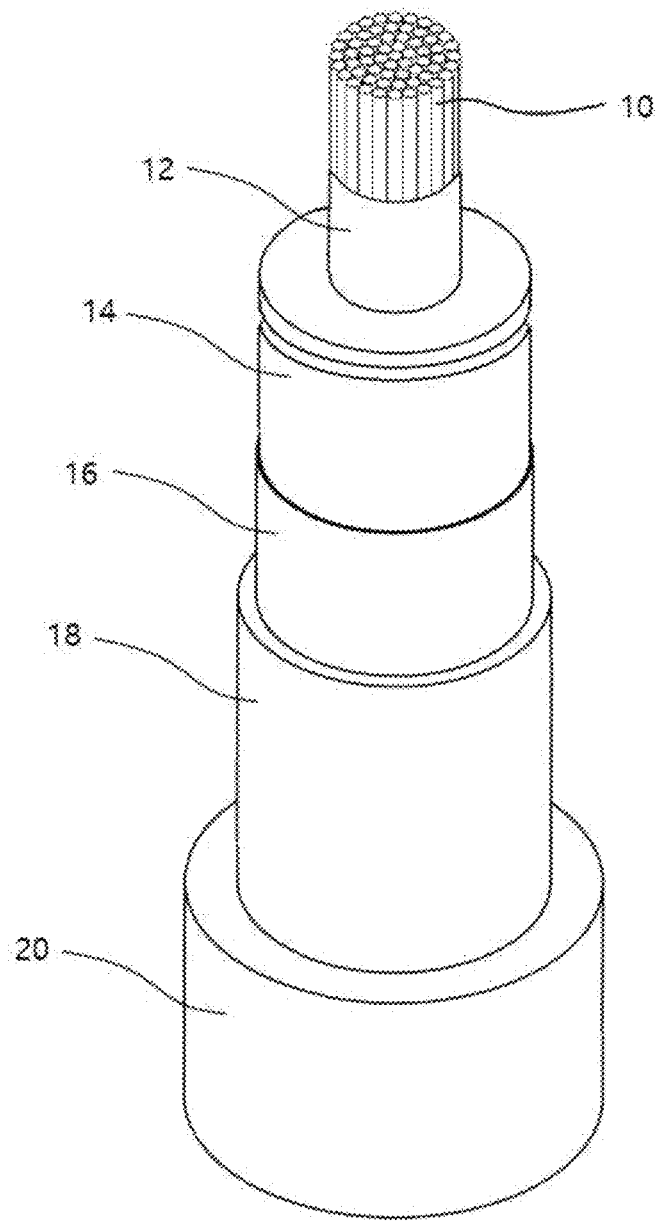
FIG. 15 is a perspective view of a power cable including a copper- or aluminum-based conductor of the present disclosure and a crosslinked polyethylene (XLPE) insulation layer in a state of being peeled in a multistage fashion.

FIG. 15 is a perspective view of a power cable including a copper- or aluminum-based conductor of the present disclosure and an XLPE insulation layer in a state of being peeled in a multistage fashion.

Referring to FIG. 15, the power cable 100 has a conductor 10 at the central part thereof. The conductor 10 serves as a path along which current flows, and may be made of, for example, copper or aluminum (including an aluminum alloy). The conductor 10 may have a stranded-wire structure in which a plurality of circular or square conductor wires is stranded so as to be flexible.

The surface of the conductor 10 is not smooth, whereby an electric field may be nonuniform and local corona discharge may easily occur. Also, in the case in which a gap is formed between the surface of the conductor 10 and an insulation layer 14, a description of which will follow, insulation performance may be deteriorated. In order to solve this problem, an inner semiconductive layer 12 made of a semiconductive material, such as a semiconductive carbon sheet, may be provided outside the conductor 10.

The inner semiconductive layer 12 equalizes charge distribution on the surface of the conductor to provide a uniform electric field, thereby improving insulation strength of the insulation layer 14, a description of which will follow. Furthermore, the inner semiconductive layer 12 may perform a function of preventing a gap from being formed between the conductor 10 and the insulation layer 14 to prevent corona discharge and ionization.

The insulation layer 14 is provided outside the inner semiconductive layer 12. In general, breakdown voltage of the insulation layer 14 must be high, and insulation performance of the insulation layer 14 must be stably maintained for a long time. Furthermore, dielectric loss of the insulation layer 14 must be small, and the insulation layer 14 must have resistance performance against heat, such as heat resistance.

A paper-insulated or resin material (e.g. XLPE) is mainly used as the insulation layer of the power cable.

The insulation layer 14 is made of a polyolefin resin, such as polyethylene or polypropylene, preferably a polyethylene resin. The polyethylene resin may be a crosslinked resin, and may be manufactured using silane or organic peroxide, such as dicumyl peroxide (DCP), as a crosslinking agent. FIG. 15 shows an example in which the insulation layer 14 of the power cable is made of an XLPE material.

An outer semiconductive layer 16 is provided outside the insulation layer 14. The outer semiconductive layer 16 is grounded, and maintains the distribution of a line of electric force between the inner semiconductive layer 12 and the outer semiconductive layer 16 in an equipotential state to improve insulation strength of the insulation layer 14. Also, in the cable, the outer semiconductive layer 16 smooths the surface of the insulation layer 14 to alleviate concentration of an electric field, thereby preventing corona discharge.

Depending on the kind of the cable, a metal sheath 18 is provided outside the outer semiconductive layer 16. The metal sheath 18 may be utilized for the purpose of electrical shielding and as a return path for short circuit current. The metal sheath 18 may be replaced with a shielding layer configured in the form of a neural wire.

An outer jacket 20 is provided at the outermost side of the power cable 100. The outer jacket 20 may be provided at the outermost side of the power cable 100 to protect the internal components of the power cable 100. Consequently, the outer jacket 20 may generally be made of polyvinyl chloride (PVC) or polyethylene (PE).

The conductor of the power cable 100 may have a stranded-wire structure, as described above, and may be made of copper, aluminum, or an alloy thereof. Copper has an advantage of high electrical conductivity, and aluminum has an advantage of low cost. In the case in which the power cable is installed, joining through a joint may be performed at intervals of several hundreds of meters or several kilometers.

In the joining structure of different kinds of conductors shown in FIGS. 1 to 12, a case in which conductors of both power cables have the same diameter while being different in kind from each other was described by way of example. Since the conductors have the same diameter, a power cable having a first conductor made of copper has low heat generation and a high energization ability but heat generation of a cable interconnecting a land section and a seabed section does not become an issue in the seabed section. Consequently, in the case in which a power cable having an aluminum-based conductor applied thereto is disposed in the seabed section, a power cable having a copper-based conductor applied thereto is disposed in the land section, and the power cables are joined to each other at a boundary zone therebetween, it is possible to obtain both effects of cost reduction and stability improvement.

In addition to the above-described special boundary zone, however, it is necessary to join both power cables having a pair of different kinds of conductors to each other through a joint. In this case, joining of power cables having different conductor diameters and thus different cable diameters to each other through a joint may be performed due to the difference in energization ability and heat generation.

Specifically, the first conductor 10A, which is a copper stranded-wire conductor, and the second conductor 10B, which is an aluminum stranded-wire conductor, may have different diameters due to energization ability and heat generation.

The present disclosure may provide a conductor joining structure applicable even in the case in which the diameters of the first conductor 10A and the second conductor 10B are different from each other. A joining structure of different kinds of conductors having different diameters and a joint of power cables including the same will be described with reference to FIGS. 16 and 17.

Figure 16:
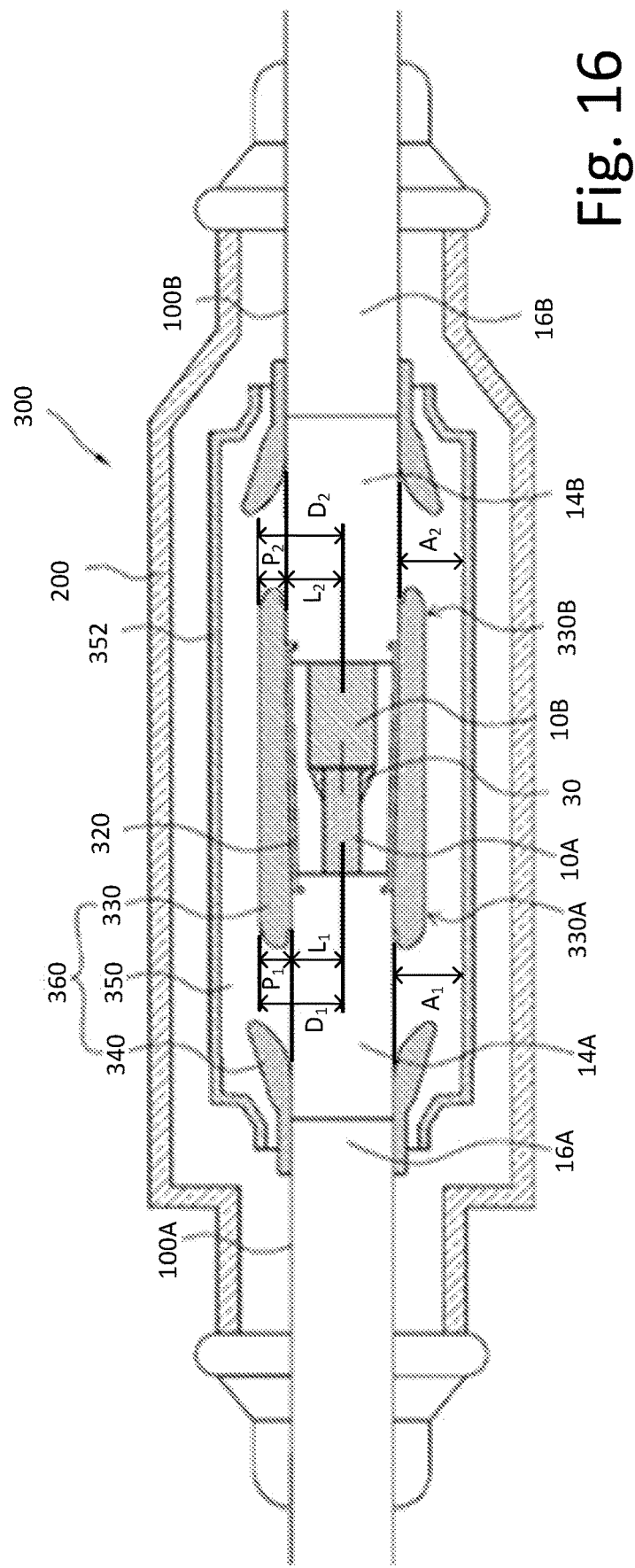
FIG. 16 is a sectional view of a joint of power cables according to an embodiment of the present disclosure.
Figure 17:
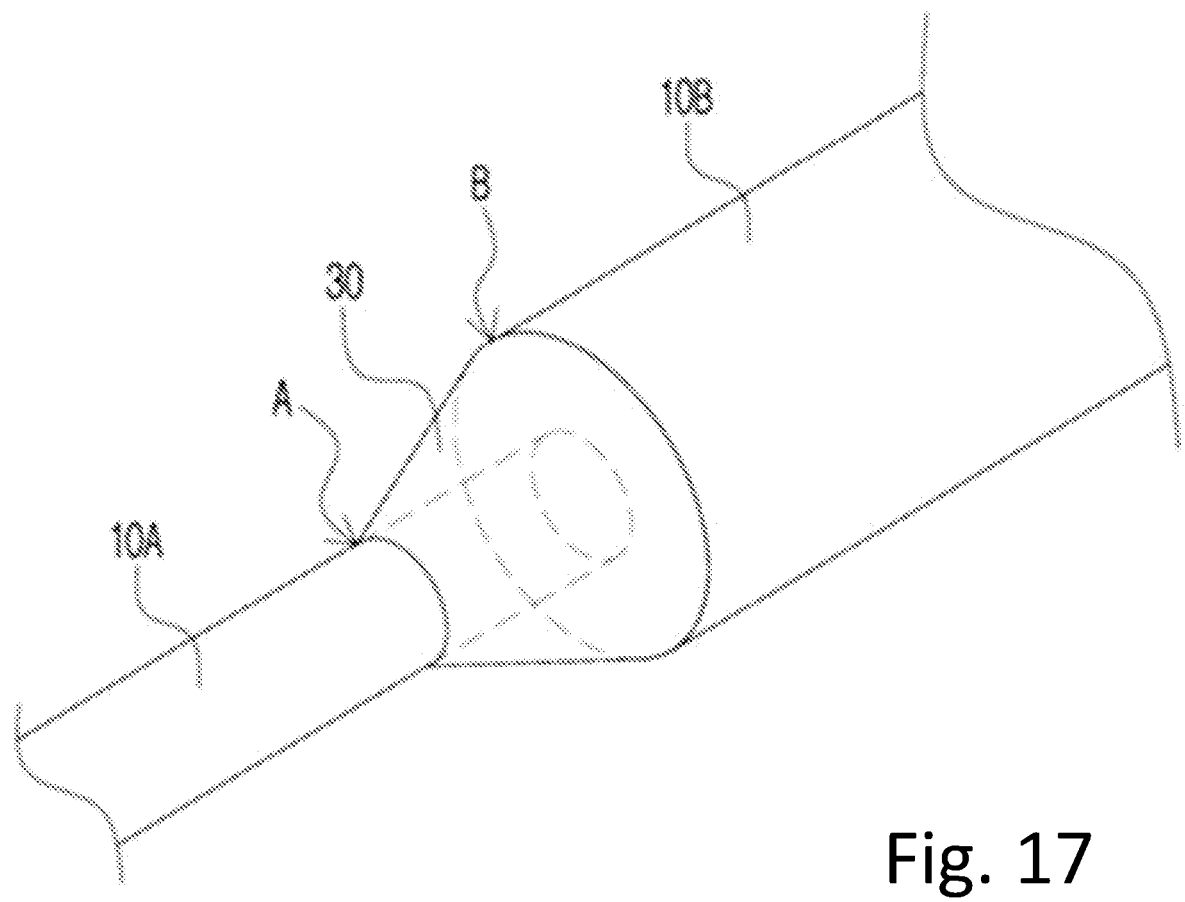
FIG. 17 is a perspective view of a conductor joining structure provided in the joint of the power cables shown in FIG. 16.

FIG. 16 is a sectional view of a joint of power cables according to an embodiment of the present disclosure, and FIG. 17 is a perspective view of a conductor joining structure provided in the joint of the power cables shown in FIG. 16.

In the embodiment shown in FIG. 16, an example in which the first conductor 10A includes copper stranded wires and the second conductor 10B includes aluminum stranded wires will be described.

Referring to FIG. 16, the joint 300 may include a joining structure of a first conductor 10A and a second conductor 10B of a pair of a first power cable 100A and a second power cable 100B, an O-ring 30 joined to ends of the first conductor 10A and the second conductor 10B, a corona shield 320 connected to insulation layers 14A and 14B of the pair of the first power cable 100A and the second power cable 100B, the corona shield 320 being configured to wrap the conductor joining structure, and a pre-molded joint (PMJ) type sleeve member 360 configured to wrap outsides of the pair of the first power cable 100A and the second power cable 100B, the sleeve member 360 being made of an elastic resin material shrinkable at room temperature. The sleeve member 360 may have a hollow form.

The corona shield 320 is formed so as to extend from the insulation layer 14A of the first power cable 100A toward the insulation layer 14B of the second power cable 100B. In this case, the corona shield 320 has a flat outer surface, is configured to surround the O-ring 30, and forms a continuous surface with the surfaces of the pair of opposite insulation layers 14A and 14B without forming a stepped portion, whereby concentration of an electric field is prevented or alleviated.

In addition, it is possible to prevent corona discharge that may occur between the pair of the first conductor 10A and the second conductor 10B connected to each other via the O-ring 30 and the sleeve member 360.

In the embodiment of the present disclosure, the pair of cables 100A and 100B having different diameters are connected to each other, whereby the corona shield 320 may be configured to have a structure in which the diameters of opposite sides of the corona shield 320 are different from each other and may have a structure in which the outside of the corona shield 320 is inclined from the second power cable 100B, the diameter of which is relatively large, to the first power cable 100A, the diameter of which is relatively small.

The sleeve member 360 may include a first electrode 330 provided outside the corona shield 320, the first electrode 330 having a first end 330A made of a copper material, the first end 330A being configured to allow an end of the first power cable 100A, the conductor diameter of which is relatively small, being inserted thereinto, and a second end 330B made of an aluminum material, the second end 330B being configured to allow an end of the second power cable 100B, the diameter of which is relatively large, to be inserted thereinto, a pair of second electrodes 340 provided so as to be opposite each other in a state of being spaced apart from the first electrode 330, and a sleeve insulation layer 350 configured to wrap the first electrode 330, the second electrodes 340, and the insulation layers 14A and 14B of the pair of the first power cable 100A and the second power cable 100B. The sleeve insulation layer 350 may be made of ethylene propylene diene monomer (EPDM) or liquid silicone rubber (LSR).

The first electrode 330 is made of a semiconductive material, is electrically connected to the first conductor 10A and the second conductor 10B of the first power cable 100A and the second power cable 100B, and serves as a so-called high-voltage electrode. Similarly, each of the second electrodes 340 is made of a semiconductive material, is connected to outer semiconductive layers 16A and 16B of the power cables, and serves as a so-called deflector. In the joint 300, therefore, an electric field is distributed between the first electrode 330 and the second electrodes 340, and the first electrode 330 and the second electrodes 340 serve to uniformly distribute the electric field therebetween such that the electric field is not locally concentrated.

Specifically, the first electrode 330 is made of a semiconductive material, is electrically connected to the first conductor 10A and the second conductor 10B of the first power cable 100A and the second power cable 100B, and serves as a so-called high-voltage electrode. Similarly, each of the second electrodes 340 is made of a semiconductive material, is connected to the outer semiconductive layers 16A and 16B of the power cables, and serves as a so-called deflector. In the joint 300, therefore, an electric field is distributed between the first electrode 330 and the second electrodes 340.

At this time, the distance D1 from the center of the cable at the position of the first end 330A of the first electrode 330 to the outer surface of the first electrode 330 and the distance D2 from the center of the second end 330B of the first electrode 330 to the outer surface of the first electrode 330 may be set so as to be equal to each other, and the distances L1 and L2 from the centers to the inner surfaces of the first electrode 330 at the first end 330A and the second end 330B and the distance P1 and P2 from the surfaces of the insulation layers 14A and 14B of the first power cable 100A and the second power cable 100B to the outer surfaces of the first power cable 100A and the second power cable 100B may be set so as to be different from each other.

The first conductor 100A and the second conductor 100B are different in material and diameter from each other, and therefore the distances from the centers of the first power cable 100A and the second power cable 100B to the outer circumferential surfaces of the insulation layers 14A and 14B of the first power cable 100A and the second power cable 100B are different from each other. However, the distances L1 and L2 from the centers to the inner surfaces of the first electrode 330 at the first end 330A and the second end 330B and the distance P1 and P2 from the surfaces of the insulation layers 14A and 14B of the first power cable 100A and the second power cable 100B to the outer surfaces of the first power cable 100A and the second power cable 100B may be set so as to be different from each other, whereby the distance D1 from the center of the cable at the position of the first end 330A of the first electrode 330 to the outer surface of the first electrode 330 and the distance D2 from the center of the second end 330B of the first electrode 330 to the outer surface of the first electrode 330 may be equal to each other.

Furthermore, the joint 300 may further include a housing 200 configured to wrap the sleeve member 360. The housing 200 may also be referred to as a so-called "coffin box" or a "metal casing." At this time, a space between the housing 200 and the sleeve member 360 may be filled with a waterproofing material (not shown).

Power cables, conductors of which are connected to each other through the conductor connection structure according to the present disclosure, may be paper-insulated cables, although a joint configured to interconnect power cables having insulation layers made of an XLPE material as an example of a pair of power cables having different kinds of conductors having different diameters was described by way of example in FIG. 16.

That is, the joining structure of different kinds of conductors and the joining method of different kinds of conductors according to the present disclosure described with reference to FIGS. 1 to 14 may be applied to joining of conductors having the same diameter and to joining of conductors having different diameters with an O-ring also being joined, and may be applied to a joint having a reinforced insulation layer configured such that insulation paper is wound outside a conductor joining structure so as to be connected to paper insulation layers of both paper-insulated power cables in addition to a joint in which a corona shield and a sleeve member are mounted outside a conductor joining structure depending on the kind of insulation layers of power cables jointed to each other. Such a paper-insulated joint may be applied to a rigid joint having a housing or to a flexible joint having no housing and configured such that respective cable layers are restored outside the reinforced insulation layer.

In the case in which power cables including different kinds of conductors, such as copper and aluminum, are jointed to each other, as previously described, diameters of the conductors and the cables must be configured to be different from each other in order to solve problems related to energization capacity and heat generation. Hereinafter, a method of jointing a pair of power cables including different kinds of conductors having different diameters to each other will be described.

Hereinafter, a sequence of connecting a pair of a first power cable 100A and a second power cable 100B having different conductor diameters to each other through a joint 300 and the joint 300 will be described in detail with reference to the accompanying drawings.

Referring to FIG. 17, an O-ring 30 configured to wrap a junction 11 may be provided in order to join the different kinds of conductors having different diameters to each other.

The O-ring 30 is fitted and mounted on a first conductor 10A. The maximum outer diameter of the O-ring 30 may be configured to be equal to the outer diameter of a second conductor 10B, and the minimum outer diameter of the O-ring (the diameter of a through hole) may be configured to be equal to the outer diameter of the first conductor 10A.

When upset butt welding is completed in a state in which the O-ring 30 is mounted, therefore, the side surface of the maximum outer diameter region B of the O-ring 30 may be joined to the end side surface of the second conductor 10B, and the inner circumferential surface of the through hole of the O-ring 30 may be joined to the outer circumferential surface of the first conductor 10A.

Consequently, it is preferable that the diameter of the through hole of the O-ring 30 have a size corresponding to the diameter of the first conductor 10A.

In this structure, the end side surfaces of the first conductor 10A and the second conductor 10B, which are different kinds of conductors having different diameters, are joined to each other, and at the same time the inner circumferential surface and the end side surface of the through hole of the O-ring 30 are joined to the inner circumferential surface of the first conductor 10A and the end side surface of the second conductor 10B, whereby the first conductor 10A and the second conductor 10B may be integrated.

The O-ring 30 may be provided to compensate for the diameter difference between the second conductor 10B of the second power cable 100B and the first conductor 10A of the first power cable 100A, thereby removing a stepped portion from the junction 11. Consequently, the O-ring 30 may be configured to have a right-triangular section or a tapered section. The O-ring 30 may have a tapered outer circumferential surface in order to remove a stepped portion from the junction 11 of the first conductor 10A and the second conductor 10B and to prevent or alleviate concentration of an electric field at the stepped portion.

The material of the O-ring 20 may be equal to the material of the first conductor 10A or the second conductor 10B. Preferably, the O-ring 20 is made of the same material as the second conductor 10B, the melting point of which is low.

Figure 18:
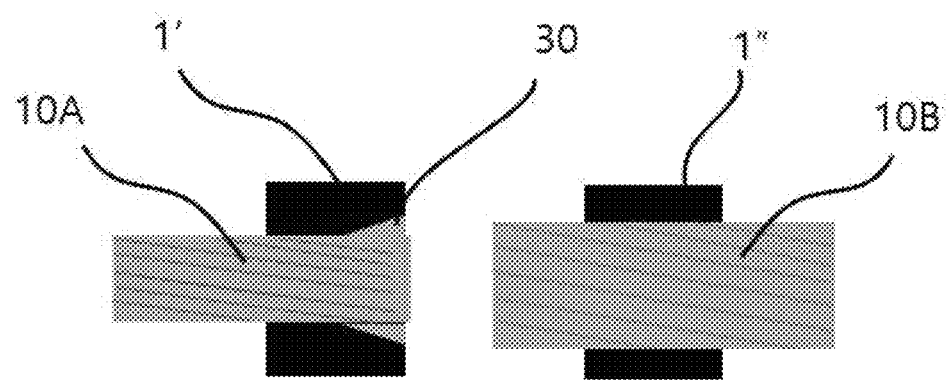
FIGS. 18 to 20 show a conductor joining process of the conductor joining structure shown in FIG. 17.
Figure 19:
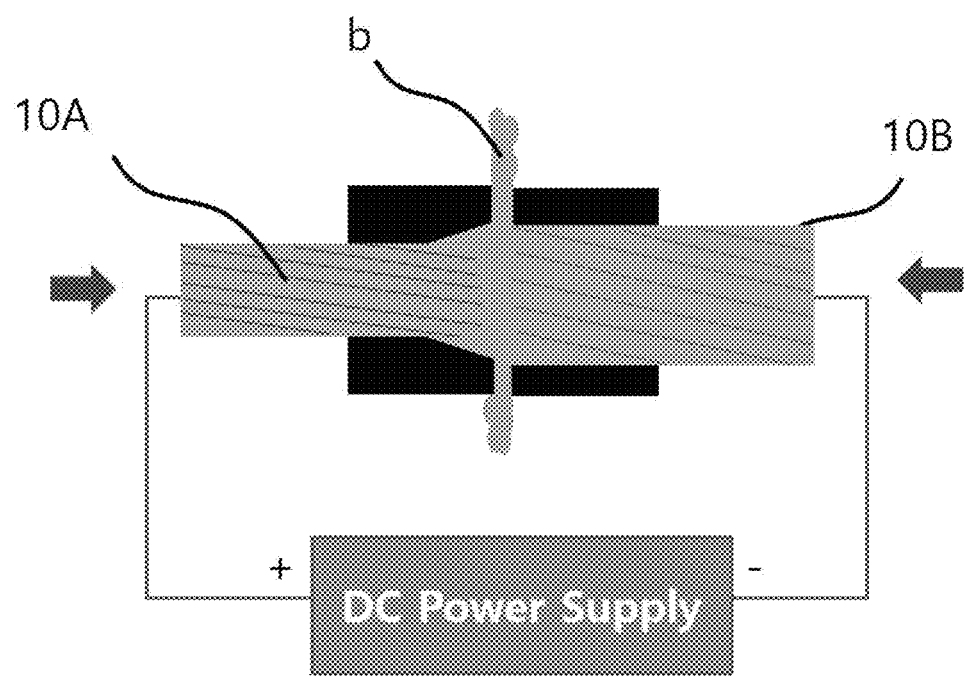
Figure 20:
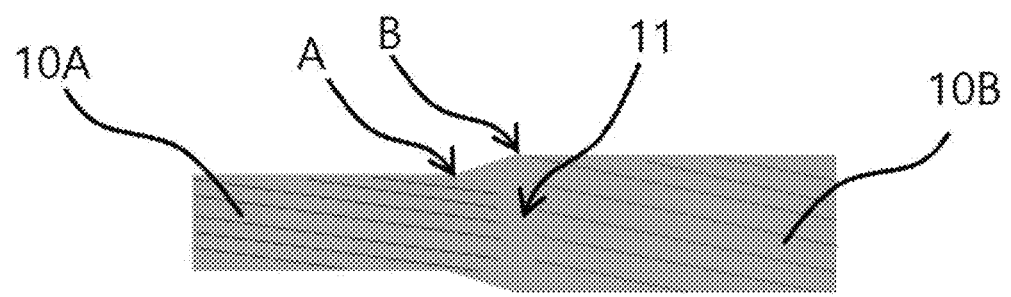

FIGS. 18 to 20 show a conductor joining process of the conductor joining structure shown in FIG. 17.

The conductor joining process of the conductor joining structure shown in FIGS. 18 to 20 is identical to the process of joining different kind of conductors having the same diameter described with reference to FIGS. 7 to 9 except that the O-ring 30 is applied in order to alleviate concentration of an electric field at the junction 11. Consequently, a duplicate description of the process of joining different kind of conductors having the same diameter described with reference to FIGS. 7 to 9 will be omitted.

In the case in which a first conductor 10A and a second conductor 10B having different diameters are mounted to welding jigs 1' and 1", as shown in FIG. 18, an O-ring 30 may be mounted to the end of the first conductor 10A. Consequently, the welding jig 1' shown in FIG. 18 may be configured to have a structure including an O-ring receiving portion, in which the first conductor 10A having the O-ring 30 mounted thereto is received.

The O-ring 30 may be made of the same material as the second conductor 10B, which has a low melting point, i.e. an aluminum-based metal. Consequently, at the time of energization and pressing, as shown in FIG. 19, the O-ring 30 may be melted and recrystallized together with the first conductor 10A and the second conductor 10B so as to be joined thereto. Although the O-ring 30 may be made of the same material as the first conductor 10A, i.e. a copper-based metal, it is preferable that the O-ring 30 be made of the same material as the second conductor 10B, which has a low melting point, in order to improve joining efficiency between the O-ring 30, the inner circumferential surface of a through hole of the O-ring 30, and the first conductor 10A inserted into the through hole.

A junction 11 of the first conductor 10A, the second conductor 10B, and the O-ring 30 joined to each other using the above method may be formed in a state in which the end of the first conductor 10A is inserted into the second conductor 10B, as shown in FIG. 20. The outer circumferential surface of the junction 11 may be replaced with the outer circumferential surface of the O-ring 30, whereby an inclined surface, rather than a stepped surface, may be formed although the conductors have different diameters.

As described above, the outer diameter of the outer circumferential surface of the O-ring 30 at the minimum outer diameter region A is equal to the outer diameter of the first conductor 10A, and the outer diameter of the outer circumferential surface of the O-ring 30 at the maximum outer diameter region B is equal to the outer diameter of the second conductor 10B. Consequently, a stepped portion of the conductor joining structure that may be formed due to the diameter difference between the first conductor 10A and the second conductor 10B having different diameters may be gently inclined, whereby it is possible to alleviate a problem related to concentration of an electric field.

As is apparent from the above description, the joining structure of different kinds of conductors, the joining method of different kinds of conductors, and the joint of power cables according to the present disclosure have effects in that it is possible to improve joining quality of the junction of different kinds of conductors and it is possible to improve joining quality of the junction and to alleviate concentration of an electric field even at the time of joining different kinds of conductors having different diameters.

In addition, the joining structure of different kinds of conductors, the joining method of different kinds of conductors, and the joint of power cables according to the present disclosure have an effect in that workability in joining different kinds of conductors is improved through the use of upset butt welding.

Although preferred embodiments of the present disclosure have been described in this specification, those skilled in the art will appreciate that various changes and modifications are possible without departing from the idea and scope of the present disclosure recited in the appended claims. Therefore, it should be understood that such changes and modifications fall within the technical category of the present disclosure as long as the changes and modifications include elements described in the claims of the present disclosure.

What is claimed is:

1. A joining structure of different kinds of conductors formed by joining a first conductor constituting a first power cable and a second conductor constituting a second power cable to each other, wherein:
   the first conductor comprises a plurality of conductor wires, an end side surface of the first conductor being processed such that a space factor of the end side surface is equal to or higher than a predetermined level,
   a melting point of the first conductor is higher than a melting point of the second conductor, and
   the end side surface of the first conductor and an end side surface of the second conductor are joined to each other by welding.

2. The joining structure according to claim 1, wherein the second conductor also comprises a plurality of conductor wires.

3. The joining structure according to claim 1, wherein the first conductor is made of a copper material or a copper alloy material, and the second conductor is made of an aluminum material or an aluminum alloy material.

4. The joining structure according to claim 1, wherein the space factor of the end side surface of the first conductor is 98% or more.

5. The joining structure according to claim 1, wherein end side surfaces of a pair of first conductors are joined to each other by welding such that the space factor of the end side surface of each of the first conductors is equal to or higher than the predetermined level to form a junction, and the junction is cut, whereby each of the first conductors is processed such that the space factor of the end side surface of each of the first conductors is equal to or higher than the predetermined level.

6. The joining structure according to claim 1, wherein the end side surface of the first conductor and the end side surface of the second conductor are joined to each other by upset butt welding.

7. The joining structure according to claim 6, wherein the upset butt welding is performed using a method of energizing the first conductor and the second conductor to melt a junction of the first conductor and the second conductor and pressing the first conductor and the second conductor toward each other.

8. The joining structure according to claim 6, wherein an exposed length of the first conductor from a welding jig configured to weld the first conductor and the second conductor is less than an exposed length of the second conductor from the welding jig.

9. The joining structure according to claim 1, wherein a diameter of the first conductor is less than a diameter of the second conductor.

10. The joining structure according to claim 9, wherein an O-ring having an outer circumferential surface inclined so as to finish a stepped portion formed due to a diameter difference between the first conductor and the second conductor as an inclined surface is also joined to a junction of the first conductor and the second conductor.

11. The joining structure according to claim 10, wherein the O-ring has a through hole configured to allow the first conductor to extend therethrough, and the first conductor, the O-ring, and the second conductor are joined to each other in a state in which an end of the first conductor is mounted in the through hole.

12. The joining structure according to claim 11, wherein the O-ring is made of a second metal material, a side surface of the O-ring in a joining direction and the end side surface of the second conductor are joined to each other, and an inner circumferential surface of the through hole of the O-ring is joined to an outer circumferential surface of the first conductor.

13. A joint of power cables comprising different kinds of conductors, the joint comprising:
   the joining structure according to claim 1;
   a corona shield configured to connect ends of crosslinked polyethylene (XLPE) insulation layers of the first power cable and the second power cable to each other, the corona shield being configured to wrap the joining structure;
   a pre-molded joint (PMJ) type sleeve member mounted outside the corona shield, the sleeve member being made of an elastic resin material; and
   a housing mounted outside the sleeve member.

14. A joint of power cables comprising different kinds of conductors, the joint comprising:
   the joining structure according to claim 1; and
   a paper-insulated insulation layer of the first power cable, a paper-insulated insulation layer of the second power cable, and a reinforced insulation layer formed as a result of insulation paper being wound outside the joining structure.

15. A joining method of different kinds of conductors to join a first conductor constituting a first power cable and a second conductor constituting a second power cable to each other, the joining method comprising:

processing an end side surface of the first conductor, the first conductor comprising stranded wires, such that a space factor of the end side surface is equal to or higher than a predetermined level (a side surface processing step);

mounting the first conductor and the second conductor to a welding jig such that an end of the first conductor is exposed by a predetermined length and an end of the second conductor, the second conductor having a lower melting point than the first conductor, is exposed by a predetermined length (a conductor mounting step); and joining the end side surface of the first conductor and an end side surface of the second conductor to each other by welding (a conductor joining step).

16. The joining method according to claim 15, wherein, in the side surface processing step of the first conductor, end side surfaces of a pair of first conductors are joined to each other by welding such that the space factor of the end side surface of each of the first conductors is equal to or higher than the predetermined level to form a junction, and the junction is cut, whereby each of the first conductors is processed such that the space factor of the end side surface of each of the first conductors is equal to or higher than the predetermined level.

17. The joining method according to claim 15, wherein the side surface processing step of the first conductor is performed such that the space factor of the end side surface of the first conductor is 98% or more.

18. The joining method according to claim 15, wherein the conductor joining step is performed by upset butt welding.

19. The joining method according to claim 18, wherein the upset butt welding in the conductor joining step is performed using a method of energizing the first conductor and the second conductor to melt a junction of the first conductor and the second conductor and pressing the first conductor and the second conductor toward each other.

20. The joining method according to claim 15, wherein the conductor mounting step is performed such that an exposed length of an end of the first conductor is less than an exposed length of an end of the second conductor.

* * * * *